UNITED STATES PATENT OFFICE.

FREDERICK LAIST AND FREDERICK F. FRICK, OF ANACONDA, MONTANA.

METHOD OF PRODUCING SULFUR DIOXID.

1,344,905.  Specification of Letters Patent.  Patented June 29, 1920.

No Drawing.   Application filed June 9, 1919. Serial No. 302,846.

*To all whom it may concern:*

Be it known that we, FREDERICK LAIST and FREDERICK F. FRICK, citizens of the United States, residing at Anaconda, in the county of Deerlodge and State of Montana, have invented certain new and useful Improvements in Methods of Producing Sulfur Dioxid, of which the following is a specification.

The present invention is a method of producing concentrated sulfur dioxid, suitable, for instance, for the manufacture of liquid sulfur dioxid, from sulfur, either free or combined as it occurs in ores, concentrates, etc.

The disposal of sulfur gases from metallurgical plants in which sulfid ores are treated presents an increasingly difficult problem. The sulfur dioxid gases from certain metallurgical processes are used extensively for the manufacture of sulfuric acid, a cheap and bulky commodity, the disposal of which is confined largely to local markets. Sulfur, on the other hand, is more valuable than sulfuric acid and is more easily handled and shipped.

When sulfid concentrates are roasted with air under commercial conditions, gases with a maximum of from 10 to 12% sulfur dioxid result. The gases from other metallurgical processes usually do not run even this high in sulfur dioxid.

There is a growing demand for liquid sulfur dioxid for manufacturing purposes. There is also a rather wide market for sulfur. Concentrated sulfur dioxid and liquid sulfur dioxid may be prepared from the metallurgical gases containing 6% or more sulfur dioxid, by a simple but rather expensive method in which the sulfur dioxid is absorbed in cold water and expelled in concentrated form by heating the cold solution to boiling in closed apparatus. Sulfur may be prepared from the sulfur dioxid in metallurgical gases by direct reduction with carbon, but in this process a large volume of inert gases which absorb considerable heat must be passed through the reduction furnaces and the volatilized sulfur must be condensed from the same large volume of gases. On the other hand, liquid sulfur dioxid may be prepared from concentrated sulfur dioxid gas by direct compression and cooling, and the direct reduction of concentrated sulfur dioxid gas with coke is a comparatively easy problem. In such a process the condensation of the sulfur from a small volume of furnace gases is a simple matter. It is evident, therefore, that concentrated sulfur dioxid gases are desirable for the preparation of liquid sulfur dioxid and sulfur.

It is the purpose of the present invention to produce concentrated sulfur dioxid in a practical and economical manner, more especially in metallurgical operations such as roasting, nodulizing and sintering, and in blast-furnace and converter practice. For this purpose pure or substantially pure oxygen or an oxygen-bearing gas is supplied to the sulfur or its compounds or the sulfur-bearing ores during the combustion, roasting, nodulizing, sintering or other operation, preferably under regulated conditions as hereinafter described.

Concentrated sulfur dioxid gas may be produced, for instance, by the roasting or equivalent heat-treatment of sulfid ores or sulfid ore products with pure oxygen. The action of pure oxygen on rich sulfid materials may be so intense, however, that the metallic sulfids are fused and sintered and the rakes and other metal parts of the furnace are softened and injured. In order to obtain concentrated sulfur dioxid gases from the usual types of furnaces and yet avoid sintering of the charge and injury to the furnace, we propose to return to the furnace a portion of the gases evolved in the process, to which gases pure oxygen is added in regulated quantity.

The multiple hearth furnace of the well-known Wedge or McDougal type is well adapted to the carying out of this process as it lends itself to the introduction of the sulfur-bearing substance and gases and the removal of the product and evolved gases without loss or contamination, and one manner in which the invention may be carried out in this type of furnace is as follows:

The sulfur dioxid gases from the furnace are preferably cooled as by scrubbing with water or in sheet iron flues. A portion of the gas, say 40%, might be withdrawn for use. The remaining 60% of the gas is mixed with sufficient oxygen to produce a mixture running 40% oxygen, and the mixture is conveyed to the furnace. It will be seen that a cyclic operation is thus established in which a portion of the gases from the furnace is used over and over again, while a certain portion of the concentrated sulfur dioxid gas is withdrawn continuously or intermittently from the cycle as desired, sufficient oxygen being introduced into the returning portion to maintain proper reaction conditions in the furnace and the desired concentration of the sulfur dioxid gas.

It is evident that by the method described sulfid ores or concentrates may be roasted under conditions comparable to those existing when air is used. The gas supplied to the furnace consists of sulfur dioxid and oxygen, however, instead of nitrogen and oxygen as when air is used. The percentage of oxygen may be varied to give the best results depending upon the character of the material being roasted and other conditions.

The oxygen may be obtained in any suitable manner. It is derived from air so cheaply by the modern liquid air processes that its commercial use in metallurgical operations is simple and feasible.

By the present method practically pure concentrated sulfur dioxid gases may be obtained from the standard types of furnaces, with the addition of comparatively simple and cheap equipment. While the process is described as especially applicable in the roasting of sulfid concentrates in multiple hearth furnaces, it is to be understood that it is equally applicable to operations in other types of furnaces, such as blast, nodulizing and sintering furnaces, as well as converters, etc., and the term "roasting" as it is used in the claims is intended to comprehend any equivalent heating operation wherein a closed chamber may be used and wherein the heat is sufficient to establish reaction between the oxygen and the sulfur.

The word "oxygen" as used in the claims is intended to include substantially pure oxygen or mixtures other than air containing sufficient available oxygen for the purposes of this invention as above explained.

In the term "sulfid ores" as used in the claims is included of course any ore or ore-product containing sulfur in substantial proportion.

We claim:

1. Method of producing sulfur dioxid of high concentration, comprising preparing a gaseous mixture consisting essentially of sulfur dioxid and oxygen, and reacting therewith on a sulfur-bearing material.

2. Method of producing sulfur dioxid of high concentration, comprising reacting on a sulfur-bearing material with a mixture containing sulfur dioxid and oxygen, the oxygen content of the mixture being in excess of the oxygen content of atmospheric air.

3. Method of producing sulfur dioxid of high concentration, comprising reacting on a sulfur-bearing material with a mixture containing sulfur dioxid and oxygen, the oxygen content of the mixture approximating 40%.

4. Method of producing sulfur dioxid of high concentration, comprising roasting a sulfur-bearing material and withdrawing the evolved gases, adding to a portion thereof sufficient oxygen to give an oxygen concentration in excess of that of atmospheric air, and returning the oxygen-containing portion of the gases to the roasting chamber.

5. Method of producing sulfur dioxid of high concentration, comprising roasting a sulfur-bearing material and withdrawing the evolved gases; adding to a portion thereof sufficient oxygen to give an oxygen concentration approximating 40%; and returning the oxygen-containing portion of the gases to the roasting chamber.

6. Method of producing sulfur dioxid of high concentration, comprising roasting a sulfur-bearing material; withdrawing approximately 40% of the gas leaving the roasting chamber; adding oxygen to the remaining portion in quantity sufficient to produce a mixture carrying approximately 40% of oxygen, and returning said mixture to the roasting chamber.

7. Method of producing sulfur dioxid of high concentration, comprising roasting a sulfur-bearing material, withdrawing and cooling the evolved gases, adding to a portion thereof sufficient oxygen to give an oxygen concentration in excess of that of atmospheric air, and returning the oxygen-containing mixture to the roasting chamber.

In testimony whereof we affix our signatures.

FREDERICK LAIST.
FREDERICK F. FRICK.